United States Patent Office 3,469,685
Patented Sept. 30, 1969

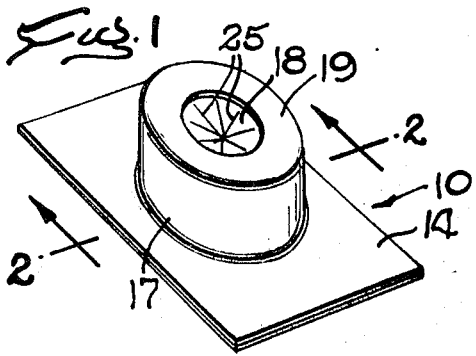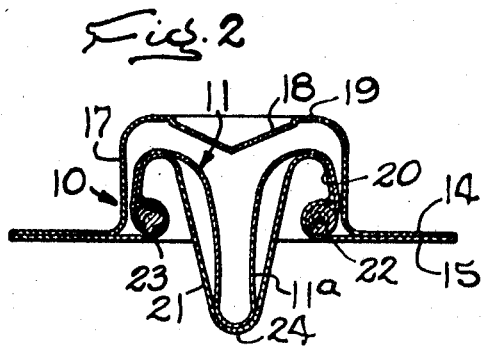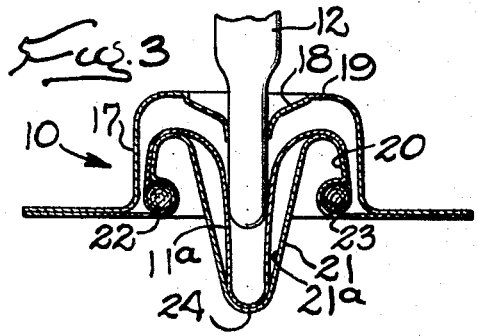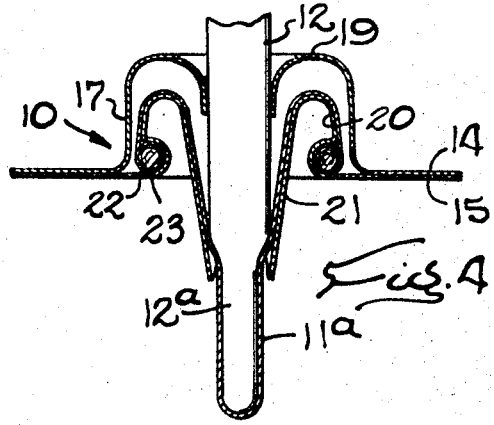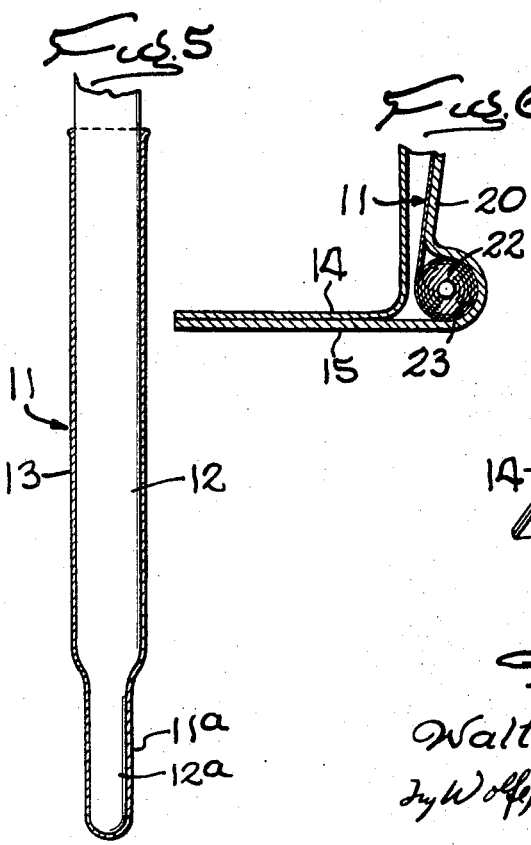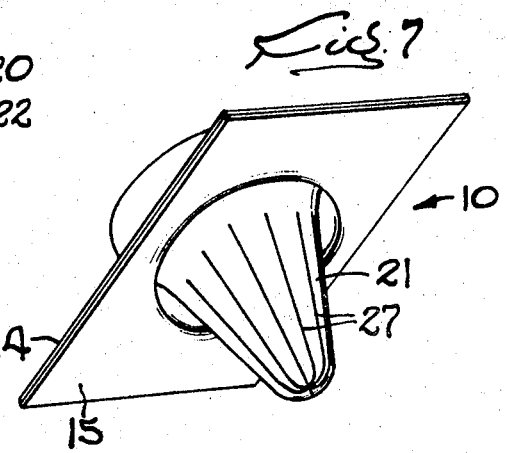

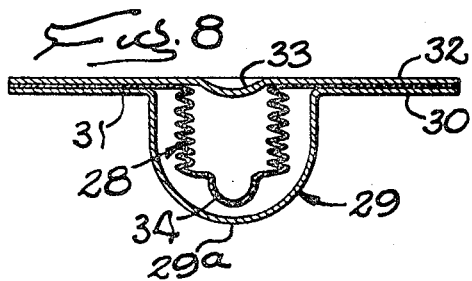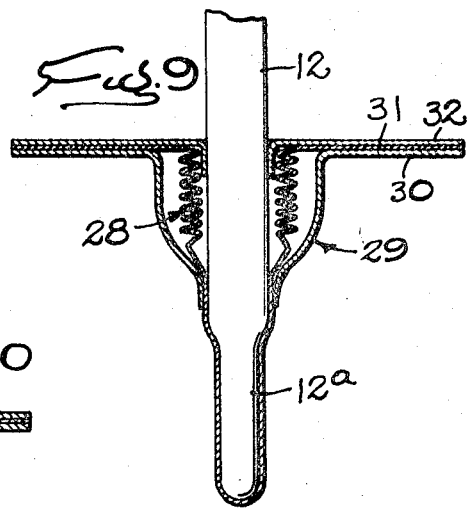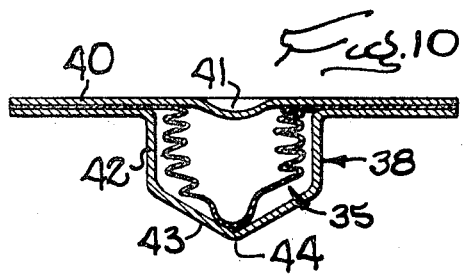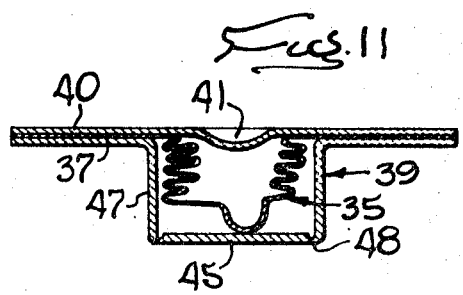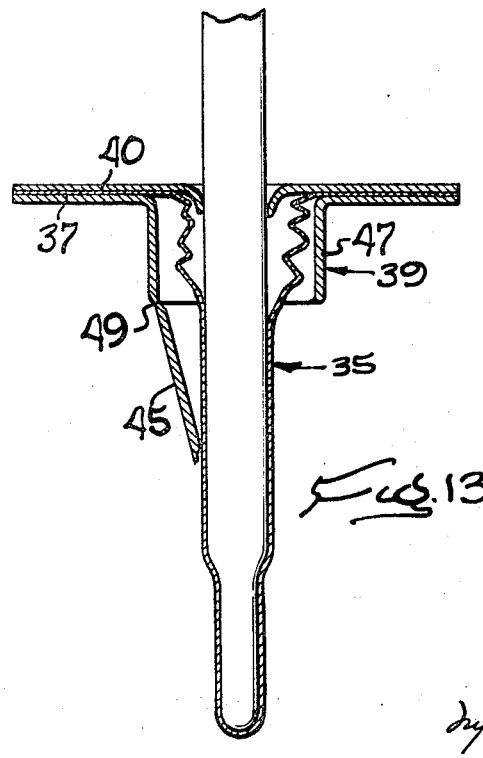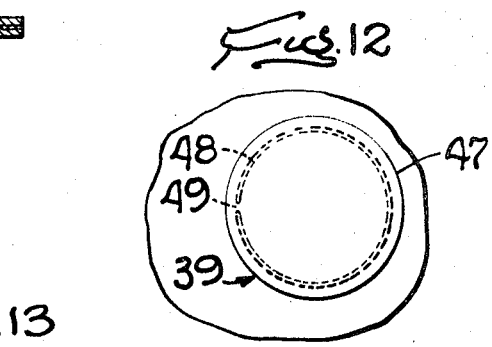

3,469,685
SHEATH PACKAGE AND METHOD OF APPLICATION
Walter P. Baermann, Raleigh, N.C., assignor, by mesne assignments, to Medical Supply Company, Rockford, Ill., a corporation of Missouri
Filed Oct. 23, 1967, Ser. No. 677,128
Int. Cl. A61l 17/02; B65d 85/20, 85/30
U.S. Cl. 206—63.2
9 Claims

ABSTRACT OF THE DISCLOSURE

A package for a sheath for protecting a thermometer including an outer cover with the sheath positioned inside the cover to receive the thermometer through one side of the package and to be extended by the instrument through the opposite side. In the first form, the cover comprises upper and lower plastic sheets sealed together around two domes, the dome of the upper sheet having a weakened depression in its top wall for insertion of the thermometer and the dome of the bottom wall including an internal rib around which the coiled sheath is fitted for uncoiling around the thermometer as the latter is pushed through the central nose portion of the lower dome. The nose portion and the depression are weakened by score lines. The alternate forms have longitudinally collapsed sheaths integrally joined to an intermediate sheet sealed between the two cover sheets in alinement with depressions on the upper sheets and disposed inside domes in the lower sheets. Two of the domes are weakened by score lines as in the first form, and another has a flat end wall substantially surrounded by a score line permitting separation of the end wall from the remainder of the dome.

Background of the invention

This invention relates generally to the protection of thermometers and other clinical instruments for the prevention of infection of patients during the use of such instruments, and to the packaging of a disposable sheath in sterile condition for use as a protective cover for the instrument, to eliminate the need for sterilization of the instrument itself.

Summary of the invention

The primary object of the present invention is to provide a novel sheath package and method of preparing clinical instruments for use in which the sheath is applied to the instrument quickly and easily as an incident to the opening of the package. A more detailed object is to package the sheath in a novel manner such that the sheath may be applied to the instrument and exposed for use simply by inserting the instrument into the package and forcing it on through the package. A related object is to accomplish the foregoing with a package that is compact and economical in construction.

Other objects and advantages of the invention will become apparent from the following detailed description taken in connection with the accompanying drawings.

Brief description of the drawings

FIGURE 1 is a perspective view of a sheath package embodying the novel features of the present invention.

FIG. 2 is a cross-sectional view taken substantially along the line 2—2 of FIG. 1.

FIG. 3 is a view similar to FIG. 2 showing the initial step in the opening of the package and the application of the sheath therein to a thermometer.

FIG. 4 is a view similar to FIG. 3 showing the continuation of the opening and application.

FIG. 5 is a fragmentary side elevation of the thermometer, showing the sheath in cross-section.

FIG. 6 is an enlarged fragmentary cross-sectional view similar to part of FIG. 2.

FIG. 7 is a perspective view of the package in FIG. 1 but taken from the opposite side.

FIG. 8 is a cross-sectional view similar to FIG. 2 but showing a second form of the invention.

FIG. 9 is a view similar to FIG. 4 but showing the second form during opening.

FIG. 10 is a cross-sectional view of a third form.

FIG. 11 is a cross-sectional view of a fourth form.

FIG. 12 is a fragmentary side view of the fourth form shown in FIG. 11.

FIG. 13 is a view similar to FIGS. 4 and 9 illustrating the opening of the fourth form.

Detailed description of the first form, FIGS. 1–7

As shown in the drawings for purposes of illustration, the invention is embodied in a package 10 (FIGS. 1–7) for a disposable sheath 11 intended for use as a protective covering for a thermometer 12 or other clinical instrument to prevent the transmission of infectious organisms from the thermometer to a patient. At least the outside surface 13 of the sheath is maintained sterile by the cover of the package prior to and during application of the sheath to the thermometer so that there is no need for sterilization of the thermometer between patients, the sheath being discarded after one use and replaced with a new sheath for the next patient.

As shown most clearly in FIG. 5, the sheath 11 is an elongated sleeve of suitable material such as vinyl having an open end for admitting the thermometer into the sheath and a closed end portion of sufficient length to cover at least the portion of the thermometer that is to be inserted in the patient. The sheath preferably is sized and shaped to fit snugly around the thermometer, the tip portion 11a being tapered to fit the bulb end 12a of the thermometer. The sheath material, of course, must conduct heat from the patient through the tip portion to the bulb end.

In accordance with the primary aspect of the present invention, the sheath 11 is positioned within the package 10 to receive the thermometer 12 into the interior of the sheath upon insertion of the thermometer into the package through a preselected area on one side of the cover, and the tip of the sheath is positioned beside a second preselected area of the cover to be pushed out through the second area by a force applied through the thermometer, the second area being rupturable by the bulb end of the thermometer within the sheath. Thus, the package is opened to expose the outside surface 13 of the sheath and the latter is applied to the thermometer in a combined operation accomplished simply by pushing the thermometer into and through the package.

In the form shown in FIGS. 1–7, the cover is formed by two sheets 14 and 15 of sealable and vacuum-formable plastic each having a central portion deformed out of the plane of the sheet into a bubble or dome. The upper cover sheet 14 is formed with a dome 17 of oval cross-section with a depression 18 in its top wall 19, and the lower cover sheet 15 has an upwardly extending annular rib 20 surrounding a downwardly projecting nose 21 of inverted generally conical shape. When the flat peripheral portions of the sheets are laid together, the rib 20 fits upwardly into the dome 17 as shown in FIGS. 2–4 and the conical recess 21a defined by the interior of the nose 21 is alined with the depression 18 in the dome.

The open-end portion of the sheath 11 is rolled or coiled upon itself almost to the tip portion 11a and fitted into the cover in the manner shown in FIGS. 2–4 wherein it will be seen that the coil 22 of the sheath is stretched around and slipped downwardly over the annular rib 20 of the lower sheet 15. Extending around the base of this rib is a groove 23 into which the coil is fitted with the tip portion of the sheath disposed in the conical recess 21a, preferably close to the end 24 of the nose 21. After the coil is installed in this manner on the lower cover sheet 15, the upper sheet 14 is laid over the lower sheet and sealed thereto in a manner suited to the particular cover material used. The possible alternatives include heat sealing, the use of adhesives, and electronic welding.

To maintain the sheath 11 sterile after the package 10 is sealed, the cover material used is impervious to the various organisms that can cause infections. There are several such materials that are well known to those skilled in the art and that, in addition, can be sterilized after sealing by known methods such as irradiation or gas sterilization.

In this instance, the depression 18 constitutes the area through which the thermometer 12 is inserted in the package 10, and the nose 21 is the area through which the sheath 11 and the thermometer are pushed. Rupturing of the upper cover sheet 14 during insertion of the thermometer is facilitated by weakening the wall of the depression, for example, by serrations or score lines 25 (FIG. 1) radiating from the center of the depression, and rupturing of the nose 21 from the inside also is facilitated by weakening the nose, again by score lines 27 (FIG. 7) formed along the sides of the nose and meeting at a preferred rupture point at the lower end 24 of the nose.

With the foregoing arrangement, the sheath 11 is sealed in the cover prior to use and thus is protected against contamination of the outside surface 13. To prepare the sheath for use, the bulb end 12$^a$ of the thermometer 12 is pressed through the weakened wall of the depression 18 and into the tip portion 11$^a$ of the sheath, as shown in FIG. 3, and then is pushed on through the package as shown in FIG. 4. After the bulb end engages the sheath end, the force of the thermometer is applied to the end 24 of the nose 21 and ruptures the latter to permit the thermometer, encased in the sheath, to pass through the nose and out of the package. The sheath, of course, unrolls onto the thermometer as it passes through, and finally is left on the thermometer as shown in FIG. 5, the entire operation being accomplished with a quick and substantially continuous motion.

Description of alternate forms, FIGS. 8–13

An alternate and somewhat simpler form of the invention is shown in FIGS. 8 and 9 in which the thermometer sheath 28 is collapsed, accordian fashion, within a simple bubble-dome 29 in the lower cover sheet 30. The sheath preferably is formed integrally with an intermediate sheet 31 sandwiched between the lower sheet and an upper sheet 32 which closes the upper side of the package. A recess 33 in the upper sheet alined with the opening into the sheath indicates the area for insertion of the thermometer, the recess again being weakened by appropriate score lines, and the central area of the dome 29 also is weakened at 29$^a$ adjacent the tip 34 of the sheath to facilitate rupturing of the package by the thermometer, as before, this being illustrated in FIG. 9. This form eliminates the coil of the first form and thus simplifies the configuration of the cover.

With the intermediate sheet 31 disposed between and appropriately sealed to the peripheral portions of both cover sheets 30 and 32, it will be seen that the cover remains attached to the sheath 28 after the thermometer 12 is fully inserted and extended. Thus, the cover can serve as a holding tab during use and also facilitates stripping of the sheath off the thermometer after the temperature of the patient has been taken. It should be noted that some cover materials, for example, polystyrene foam, are inherently weak enough to permit rupturing of the cover without special weakening devices.

Similar forms are shown in FIGS. 10–13, each having a sheath 35 that is integrally joined to an intermediate sheet 37 and longitudinally collapsed into a more compact condition between a dome 38 or 39 and an upper cover sheet 40 preferably formed with a weakened area 41 for entry of the thermometer 12 into the package. In FIG. 10, the dome 38 has a cylindrical or oval sidewall 42 and a peaked end wall 43 with score lines (not shown) as in FIG. 7 radiating from the rupture point at the peak 44.

In FIGS. 11–13, the cylindrical or oval dome 39 has a flat end wall 45 joined to the sidewall 47 by a rupturable web 48 formed by an internal groove or score line weakening the end wall close to the sidewall. While this score line could extend completely around the end wall for full separation of the latter from the package during opening, it is preferred to leave a small gap 49 (FIG. 12) on one side to form a hinge (see FIG. 13) retaining the end wall on the sidewall after the dome is ruptured.

From the foregoing, it will be evident that the package and method constituting the present invention make it possible not only to maintain the outer surface of the sheath sterile prior to use, but also to apply the sheath to a thermometer 12 or other clinical instrument in an extremely rapid and convenient manner when the sheath is to be used, simply by pushing the instrument into and through the package. Moreover, it will be seen that the package may take different shapes, and capsule-like shape herein illustrated being preferred for reasons of appearance as well as compactness but not being essential to the invention.

I claim as my invention:

1. A thermometer sheath package comprising a sheath having an open end for receiving a thermometer and a closed end portion for covering a substantial portion of the thermometer, and a sealed cover for said sheath composed of impervious material and having a dome on one side and a wall on the opposite side, said sheath being disposed in said cover with the closed end adjacent said dome and the interior of the sheath opening toward said wall to receive a thermometer inserted into the package through the wall, and means weakening said cover for rupturing of the same by a thermometer inserted into the sheath through the wall and pushed, within the sheath, against the dome to extend the sheath and the thermometer through the dome for use.

2. A sheath package as defined by claim 1 in which said sheath is partially rolled into a coil, and further including means supporting the coil in said cover for uncoiling of the sheath onto a thermometer as an incident to the pushing of the thermometer through the package.

3. A sheath package as defined in claim 1 in which the open-end portion of said sheath is joined to said cover and the sheath is collapsed accordian fashion within said dome.

4. A sheath package as defined in claim 1 in which said weakening means include score lines weakening both said wall and said dome for rupturing by the thermometer.

5. A sheath package as defined in claim 1 in which said dome has an area substantially surrounded by weakening means for rupturing by pushing the thermometer against said area from inside the package.

6. A sheath package comprising a sheath having an open end for receiving an elongated instrument and a closed end portion for covering a substantial portion of the instrument, said sheath being composed of flexible heat-conducting material and disposed within said package, and an outer cover for said sheath enclosing at least the outside surface of the sheath, said outer cover having a first area on one side through which the instrument can be inserted into the cover, said open end facing toward said first area to receive the instrument into the sheath upon insertion of the instrument into the cover, and said cover having a second area on another side positioned for engagement with the end of the instrument inserted into the sheath through said first area, said second area being rupturable by the instrument within the sheath whereby the sheath may be exposed by pushing the instrument and the sheath through said second area.

7. A sheath package as defined in claim 6 further including means weakening said cover at said second area for rupturing of the same by the instrument within said sheath.

8. A sheath package as defined in claim 6 in which said cover further includes a cover sheet overlying said open end of the sheath and sealed to the remainder of the cover, said first area being a portion of said cover sheet and having means thereon weakening said area for rupturing by an instrument pressed against the area from outside the package.

9. The method of preparing a clinical instrument for insertion in a patient, said method comprising the steps of, providing a protective sheath having an open end and a closed end portion sized to cover the portion of the instrument to be inserted in the patient, disposing said sheath in a cover sealingly enclosing at least the outside surface of the sheath and sterilizing the interior of said cover to maintain said surface sterile prior to opening of the cover, inserting the instrument into the cover and through said open end into said sheath, and forcing the instrument and the sheath on through a portion of the cover to expose the sheath for use with the instrument therein.

References Cited

UNITED STATES PATENTS

| | | |
|---|---|---|
| 3,143,429 | 8/1964 | Swanson et al. |
| 3,282,414 | 11/1966 | Penksa _____ 206—63.2 |
| 3,301,394 | 1/1967 | Baermann et al. _____ 206—63.2 |

FOREIGN PATENTS

| | | |
|---|---|---|
| 106,568 | 11/1899 | Germany. |
| 898,580 | 12/1953 | Germany. |

WILLIAM T. DIXSON, Jr., Primary Examiner

U.S. Cl. X.R.

128—260; 206—16.5